United States Patent [19]

Nagano

[11] 4,270,402
[45] Jun. 2, 1981

[54] SPEED CHANGING DEVICE FOR A BICYCLE

[75] Inventor: Masashi Nagano, Sakai, Japan

[73] Assignee: Shimano Industrial Company, Limited, Osaka, Japan

[21] Appl. No.: 946,725

[22] Filed: Sep. 28, 1978

[30] Foreign Application Priority Data

Oct. 5, 1977 [JP] Japan .................. 52/120603
Oct. 5, 1977 [JP] Japan .................. 52/120604

[51] Int. Cl.³ ............................................. B60K 20/00
[52] U.S. Cl. .............................. 74/473 R; 74/471 R; 74/501 R
[58] Field of Search .................. 74/473 R, 473 P, 475, 74/501 R, 471 XY

[56] References Cited

U.S. PATENT DOCUMENTS

| | | | |
|---|---|---|---|
| 2,265,260 | 12/1941 | Argo | 74/47 B |
| 2,544,853 | 3/1951 | Oates | 74/501 R |
| 3,049,023 | 8/1962 | McCordic | 74/473 |
| 3,808,907 | 5/1974 | Yamaguchi | 74/473 R |
| 3,987,878 | 10/1976 | Hansen | 74/471 XY |
| 4,055,093 | 10/1977 | Ross | 74/473 R |

FOREIGN PATENT DOCUMENTS 1928578 4/1970 Fed. Rep. of Germany .

Primary Examiner—Kenneth Dorner
Attorney, Agent, or Firm—Stevens, Davis, Miller & Mosher

[57] ABSTRACT

A speed changing device is disclosed as comprising a base member fixed to a bicycle frame, mainly to a top tube, a pivot provided at the base member, a single control lever supported to the pivot rotatably therearound, first and a second independently rotatable winding bodies supported axially of the control lever, control wires for a front and a rear derailleur attached to the first and second winding bodies respectively, and coupling means comprising at least one retainer and a first and a second engaging portion in engagement with the retainer provided so as to couple the control lever selectively with one of the first and second winding bodies, thereby controlling the front and rear derailleurs by a single control lever.

4 Claims, 10 Drawing Figures

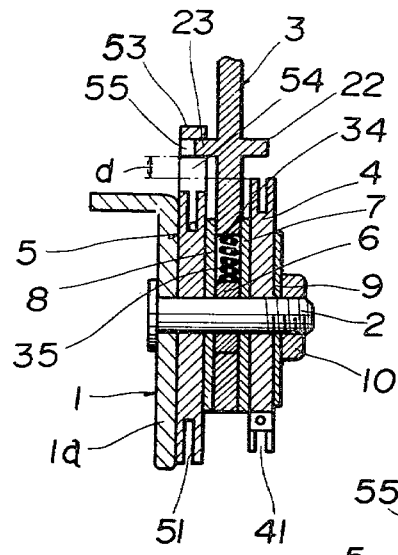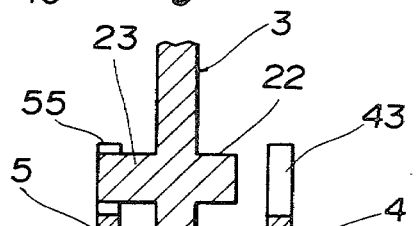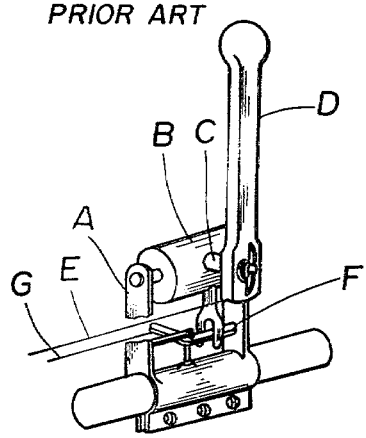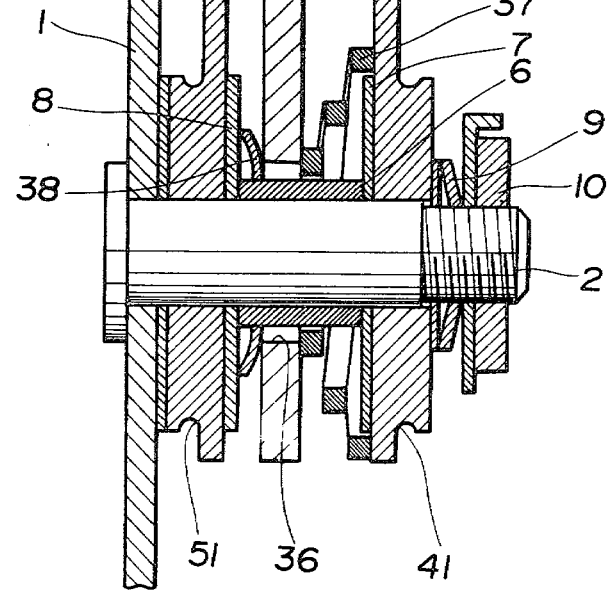

SPEED CHANGING DEVICE FOR A BICYCLE

This invention relates to a speed changing device for a bicycle, which controls a front and a rear derailleur thereof.

Conventionally, a speed change mechanism for a bicycle is well-known. It comprises two or more multi-speed sprockets which are mounted to crank means having pedals and a rear hub of the bicycle respectively, and a front and a rear derailleur mounted to a seat tube and back fork respectively, the derailleurs being operated to shift a driving chain to each one of the sprockets, thereby changing the speed in five or more stages, for example, ten stages.

The described speed change mechanism is usually provided with separate control levers for separately operating the front and rear derailleurs.

This construction is complicated as it requires the provision of two control levers. Furthermore, the levers are arranged at both sides lengthwise of the top tube so that a driver must manipulate differently positioned levers which may cause shifting mistakes or the failure of a driver to look ahead due to the need to see a shift of the lever while driving the bicycle, resulting in the occurrence of a dangerous accident.

Heretofore, a single control lever for controlling of two derailleurs, has been desired, but a simply constructed speed control device controllable by a single lever without errors has not been devised.

A conventional control device designed to meet the requirement for a single lever shifter is shown in FIG. 9. This has a base member A rotatably supporting a drum B, a single control lever D supported to the drum B through a shaft C perpendicular to the axis of the drum, a wire E for controlling the rear derailleur attached to the lever D, and a link mechanism F between the drum B and the base member A to which a control wire G for controlling a front derailleur is attached. With this construction, the lever D can turn around the axis C to control the rear derailleur and it can rotate the drum B to control therewith the front derailleur.

This construction is not only complicated, but also the lever control is inaccurate.

The present invention has been designed to cure this problem. An object of the invention is to provide a speed changing device of simple construction which performs a simple and reliable selective control of the front and rear derailleurs. Another object is to control each derailleur by a light touch even though the lever control is restricted in a given range.

The invention is designed to control the front and rear derailleurs by only a single control lever. It comprises a pivot provided at a base member fixed to the bicycle frame, mainly to the top tube, a single control lever rotatably supported to the pivot, a first and a second winding body each independently rotatably with respect to the lever and supported axially thereof, a pair of control wires each carried on a respective first and second winding body for respectively controlling the front and rear derailleurs, and coupling means comprising at least one retainer and a first and a second engaging portion in engagement with the retainer to allow the control lever to selectively engage with the first or second winding body, thus enabling the single lever to control the front and rear derailleurs.

The first and second engaging portions are respectively provided at the first and second winding bodies, and the retainers are fixed to the control lever which is movable radially or axially of the pivot, or supported through a rod movably or rotatably with respect to the control lever. The control lever is moved axially or radially of the pivot or the rod is moved or rotated to allow one of the retainers to engage selectively with one of the first and second engaging portions, thereby coupling the control lever with one of the winding bodies.

Accordingly, the single control lever is turned around one pivot to control both the front and rear derailleurs. As a result, the speed changing device of the invention malfunctions less frequently and is also simple in construction because one pivot carries the single control lever and two winding bodies.

These and other objects, features and advantages of the invention will become more apparent upon a reading of the following detailed specification and drawings, in which.

Figure 1:
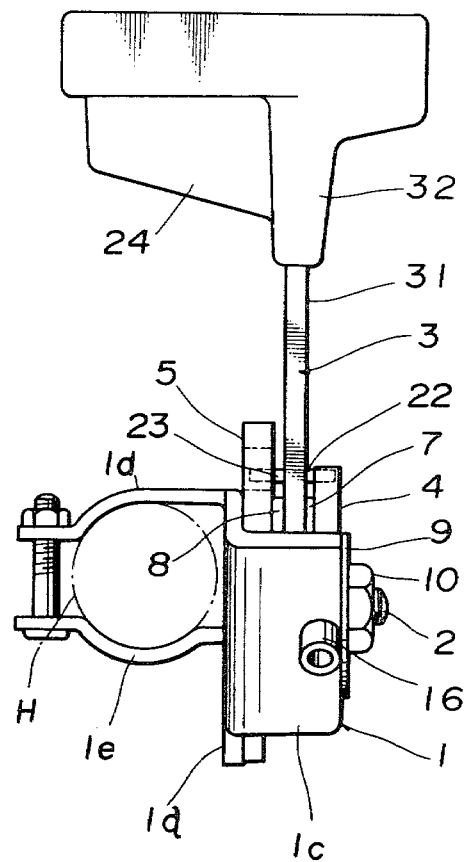
FIG. 1 is a side view of a typical embodiment of the invention.
Figure 5:
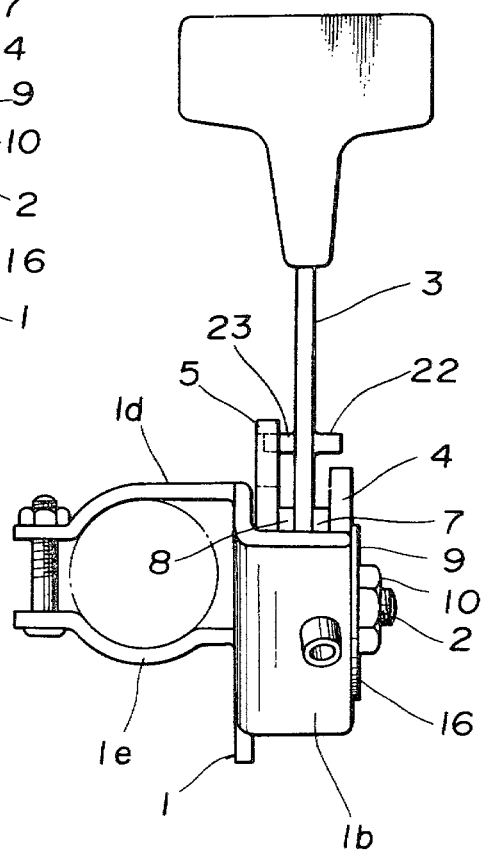
Figure 2:
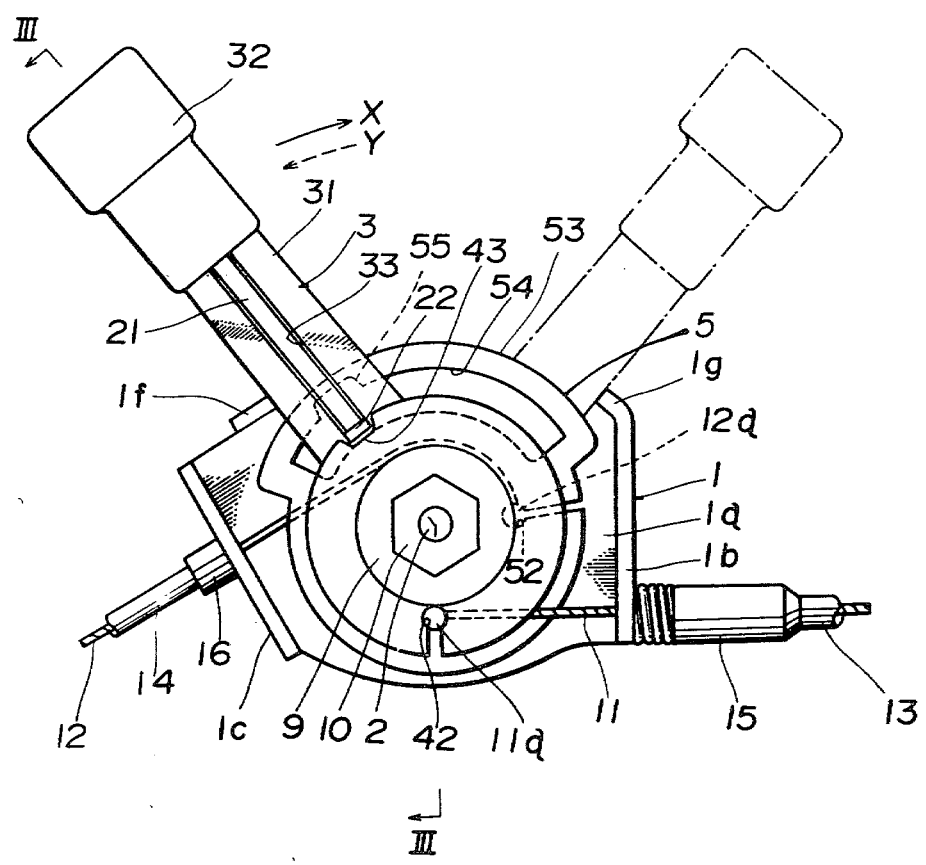
FIG. 2 is a front view thereof.
Figure 3:
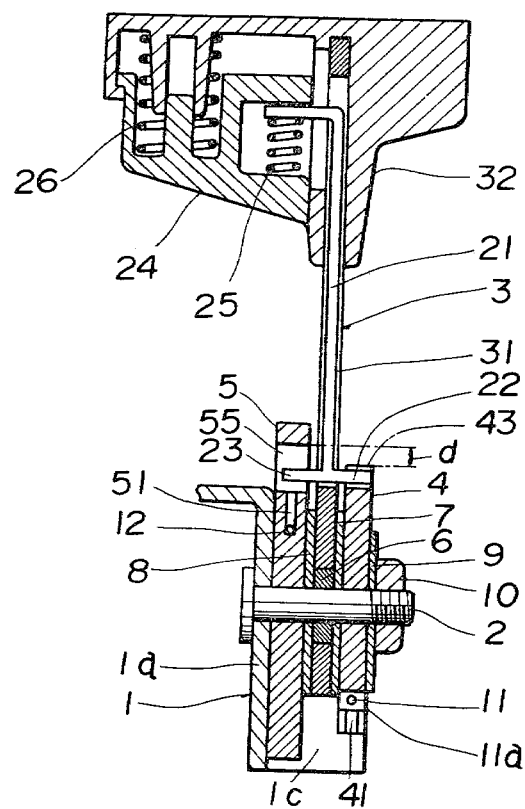
FIG. 3 is a sectional view taken on Line III—III in FIG. 2.
Figure 4:
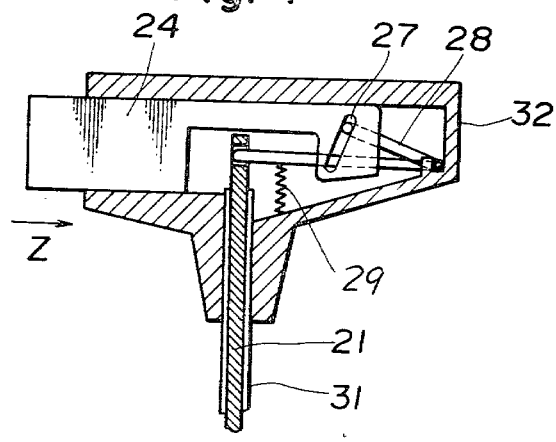
Figure 6:
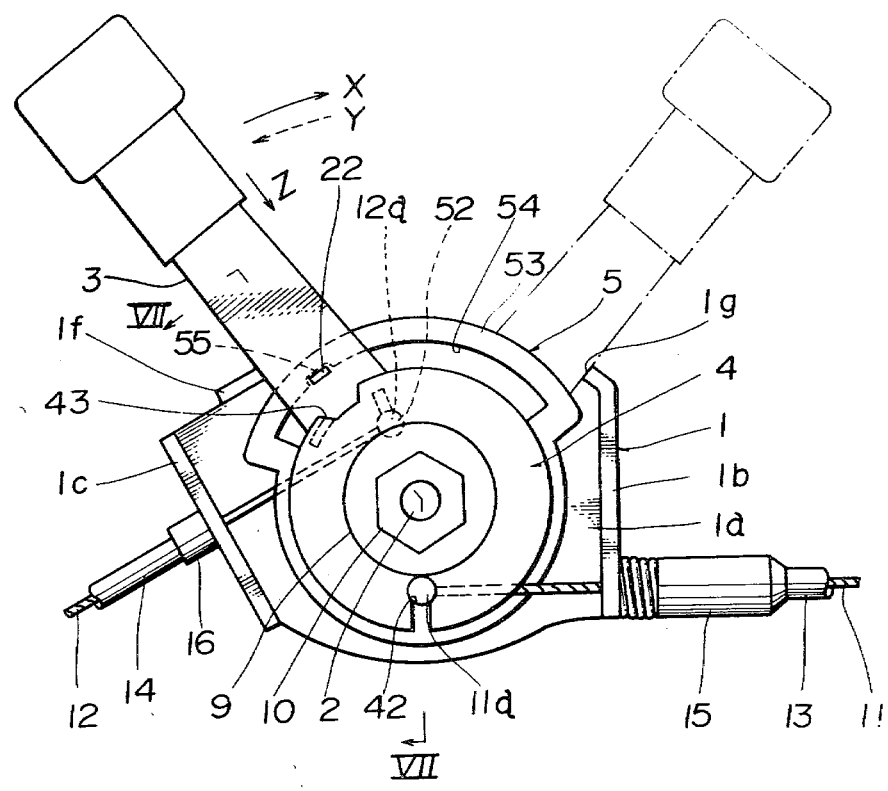

FIG. 4 is a view of a modified embodiment of a rod control included in the embodiment shown in FIGS. 1 through 3, in which only a grip of the lever is shown in section, FIG. 5 is a side view of another modified embodiment of the invention, FIG. 6 is a front view thereof, FIG. 7 is a sectional view taken on Line VII—VII in FIG. 6, FIG. 8 is an enlarged sectional view of a further modified embodiment, in which a control lever movable axially of a pivot is different from the lever in the embodiments in FIGS. 5 through 7, and FIG. 9 is a perspective view of a conventional speed changing device.

Figure 10:
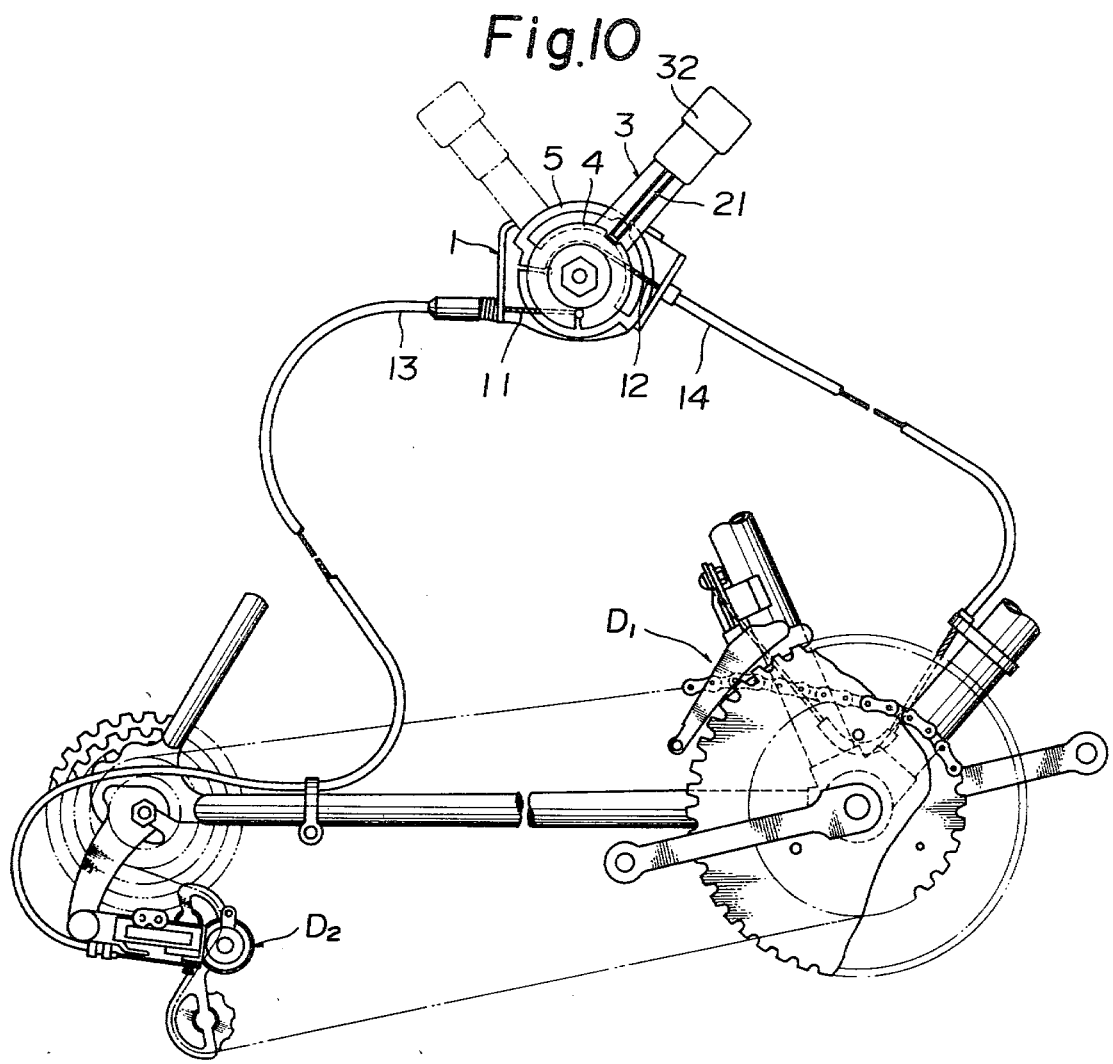

FIG. 10 is a side view of the FIGS. 1–3 embodiment connected with the front and rear derailleurs of a bicycle.

A typical embodiment of the invention will be described in accordance with FIGS. 1 through 3, in which the reference numeral 1 designates a base member fixed to the bicycle frame, e.g., the top tube H. The base member 1 is formed of a metallic plate and comprises a vertical wall 1a and walls 1b and 1c formed upright to the wall 1a at both lengthwise ends thereof, and vertical wall 1a being fixed to the top tube H through tightening bands 1d and 1e and having at a substantially central portion a pivot 2 projecting therefrom, the pivot 2 being fixed to the wall 1a by fixing means, such as caulking.

The reference numeral 3 designates a control lever supported to the pivot 2 as to be freely turnable therearound, the control lever 3 having its turning restricted to a given range by stoppers 1f and 1g provided at the base member 1. The reference numerals 4 and 5 respectively designate a first and a second winding body rotatably supported to the pivot 2 at opposite axial sides of the control lever 3. The first and second winding bodies 4 and 5 have guide grooves 41 and 51 for guiding therethrough control wires 11 and 12 and recesses 42 and 52 for receiving therein swollen terminals 11a and 12a of the wires 11 and 12 respectively. The control wire 11 (hereinafter called the rear wire) is wound onto the first winding body 4 to control the rear derailleur and control wire 12 (hereinafter called the front wire) is wound onto the second winding body 5 to control the front derailleur, both the wires 11 and 12 being supported to the winding bodies through the swollen terminals 11a and 12a inserted into the recesses 42 and 52 respectively.

In addition, outer sheaths 13 and 14 guiding the wires 11 and 12 are supported at terminal ends thereof to outer stops 15 and 16 at the upright walls 1b and 1c of the base member 1 respectively.

The control lever 3 and winding bodies 4 and 5 are, as shown in FIG. 3, supported to the pivot 2 in such a manner that a collar 6 slightly larger in thickness than the lever 3 is sleeved onto an axially intermediate portion of the pivot 2 so that the lever 3 may be supported to the pivot 2 through the collar 6 in relation of being freely turnable independently of the winding bodies 4 and 5 without rotational resistance against the lever's turn in a given range. Washers 7 and 8 are sandwiched between the collar 6 and the respective winding bodies 4 and 5 and abut against both sides of the control lever 3. A nut 10 is screwed with one axial end of the pivot 2 through a dish-like spring 9. The nut 10 is tightened to urge the winding bodies 4 and 5 toward the vertical wall 1a of the base member 1 through the washers 7 and 8, collar 6, and lever 3, thereby applying to each of the winding bodies 4 and 5 frictional resistance, i.e., rotational resistance overcoming the force of the return springs of the front and rear derailleurs. Hence, the front and rear derailleurs are, after being controlled by rotation of the winding bodies 4 and 5, held at a desired speed stage.

A coupling means for coupling the lever 3 selectively with one of the winding bodies 4 and 5, is provided between the lever 3 and the first and second winding bodies 4 and 5 so that as the lever 3 is turned it rotates one of the winding bodies 4 and 5 through the coupling means.

The coupling means comprises a first and a second engaging portion at the first and second winding bodies 4 and 5 and at least one retainer engageable selectively with one of the engaging portions.

The coupling means in the embodiment shown in FIGS. 1 through 3 has two retainers represented by the reference numerals 22 and 23. The two retainers 22 and 23 are carried by a rod 21 which is supported movably lengthwise of the lever 3. As the rod 21 moves lengthwise one of the retainers 22 and 23 engages with either a first engaging portion 43 at the first winding body 4 or a second one 55 at the second winding body 5.

In detail, the lever 3, as shown in FIG. 2, comprises a lever body 31 of relatively large width and a grip 32 fixed to the foremost end of the body 31, the lever body 31 providing at the widthwise middle thereof a guide groove 33 extending lengthwise of the same, the guide groove 33 accommodating therein the rod 21 allowing it to be movable.

The rod 21 carries at its lower end the retainers 22 and 23 which are directed toward the winding bodies 4 and 5 respectively, and is bent perpendicularly at the upper end as shown in FIG. 3, the bent end cooperate with a rod control 24 through a spring 25. The rod control 24 is supported to the grip 32 at the lever 3 slidably through a return spring 26.

Referring to FIG. 2, the first winding body 4 has at its outer periphery the first engaging portion 43 into which the first retainer 22 is insertably engaged, and the second winding body 5 has an arcuated portion 53 of a larger diameter, the larger diameter portion 53 having an elongate slot 54 of a circular arc of width larger than thickness of the retainer 23. The slot 54 has at its radially outwardly inner surface the second engaging portion 55 engageable with the retainer 23.

The radially inwardly inner surface of the slot 54 is made level with or slightly lower than the outer periphery of the first winding body 4, and a clearance d (FIG. 3) is provided between the radially outwardly inner surface of the arcuate slot 54 and the outer periphery of the first winding body 4, the clearance d being larger than thickness of the retainer 23. The rod 21 in FIG. 3 is raised to position the retainer 23 within the clearance d, whereby the retainer 23 is movable without hindrance within to allow the lever 3 to turn without moving the winding bodies 4 and 5, the clearance d serving as the the clearance d neutral zone.

FIG. 10 illustrates how the FIGS. 1–3 shifter is connected with a front and rear derailleur of a bicycle.

Next, the function of speed changing device of the invention constructed as described above will be detailed in the following description.

In the speed changing device shown by the solid line in FIG. 2, the control lever 3 abuts against one stopper 1f, the rod 21 is lowered by the spring 26, the retainer 22 is engaged with the first engaging portion 43 at the first winding body 4, and the second engaging portion 55 at the second winding body 5 is positioned at a side of the stopper 1f.

Under this condition, the rear derailleur is at the high speed stage and the front one is at the low and a description of the control of the rear derailleur to the low speed stage will be provided.

The lever 3 is turned in the arrow X direction to control the rear derailleur because the rod 21 and rod control 24 are lowered by the spring 26 and the retainer 22 is engaged with the first engaging portion 43, so that the first winding body 4 rotates together with the turning lever 3 to wind up the rear wire 11 through the guide groove 41, thereby shifting the rear derailleur to the low speed stage. In this operating mode the retainer 23 within the slot 54 is not engaged with the second engaging portion 55, whereby the second winding body 5 is stationary keeping the front derailleur in the low speed stage.

Next, to shift the front derailleur to the high speed stage from the low speed stage illustrated in FIG. 2, a rider firstly grips the rod control 24 of the grip 32 to raise the rod 21 against the spring 26 to thereby engage the retainer 23 with the second engaging portion 55, and then the lever 3 is turned in the arrow X direction, whereby the second winding body 5 rotates together with the lever 3 to wind up the front wire 12 through the guide groove 51, thus shifting the front derailleur to the high speed stage.

When the rear derailleur is in the low speed stage after the lever 3 has been turned as shown the dot-and-dash line in FIG. 2 and by the first winding body 4 rotated clockwise, the front derailleur is shifted from the low speed stage to the high speed stage by raising the rod 21 to locate the retainer 23 within the clearance; i.e. the neutral zone thereafter, the lever 3 is turned in the arrow Y direction and positioned as shown by the solid line, the rod 21 is then further raised to engage the retainer 23 with the second engaging portion 55, and then finally the lever 3 is turned in the arrow X direction while retaining the engagement between retainer 23 and the second engaging portion 55.

Hence, the rod 21 is controlled to selectively engage one of the retainers 22 and 23 with one of the first and the second engaging portions, whereby one of the winding bodies 4 and 5 rotates together with the lever 3 to separately control the front or rear derailleur.

Furthermore, the neutral zone for the retainer 23 enables the lever 3 to be controllable independently of each of the winding bodies 4 and 5, so that the lever is, even though having a restricted turning range, not forced to be operated therein and a display of speed change stage is always accurate.

In addition, the rod 21 of the aforesaid embodiment may, instead of moving lengthwise of the control lever 3, be turned around the axis extending lengthwise thereof, or around the axis perpendicular to the longitudinal direction of the lever 3. In this instance, there is no need for the two retainers to be provided. In addition, the retainer is separate from the rod 21 so that the rod 21 moving lengthwise of the control lever 3 allows the retainer to move at right angles thereof, thereby selectively engaging the retainer with the engaging portion 43 or 55.

The rod 21 which moves lengthwise of the control lever 3, may have a rod control 24 shown in FIG. 4, instead of that shown in FIG. 3, associated with the rod 21 through a link mechanism. The rod control 24 shown in FIG. 4 is mounted to the grip 32 so as to be slidable perpendicularly to the longitudinal direction of the control lever 3 and is provided with a guide slot 27 slant upwardly toward the rod 21. A substantially L-like shaped link 28 is housed within the grip 32, the link 28 being pivoted at its corner to the grip 32 and engaged at one end with the guide slot 27 and at the other end with the rod 21. The rod control 24 is moved in the Z direction in FIG. 4 to allow the link 28 to turn counterclockwise around its corner, thereby lowering the rod 21. A return spring 29 connects the link 28 with the grip 32.

The retainers 22 and 23 controlled by the rod 21 as described above may be attached directly to the control lever 3, which is, as shown in FIGS. 7 and 8, supported movably radially or axially of the pivot 2, whereby the lever 3 is operated to allow one of the retainers 22 and 23 to engage with a selected one of the first and second engaging portions 43 and 55.

In detail, the control lever 3 shown in FIG. 7 is provided at its portion which pivots about the pivot 2 with an elongate slot 34 extending radially thereof, into which slot the collar 6 is inserted and sleeved onto the pivot movably axially thereof, so that the lever 3 is supported rotatably around and movably radially of the pivot 2. A spring 35 which constantly urges the control lever 3 radially outwardly of the pivot 2 is inserted between one lengthwise end of the slot 34 and the collar 6, whereby the spring 35 acts to engage the retainer 23 with the second engaging portion 55 of the second winding body 5.

A front view of the FIG. 7 embodiment is shown in FIG. 6 with the same shifting condition as shown in FIG. 2 being shown by the solid line; that is, the control lever 3 abuts against one stopper 1f, the retainer 23 is in engagement with the second engaging portion 55 at the second winding body 5, and the rear derailleur is at the high speed stage and the front one is at the low speed stage. The front derailleur is shifted to the high speed stage by turning the lever 3 in the arrow X direction. The rear derailleur is controlled from the high speed stage to the low speed stage by lowering the lever 3 in the arrow Z direction against the spring 35, whereby the retainer 22 is engaged with the first engaging portion 43 at the first winding body 4, and then the lever 3 is turned in the arrow X direction.

In the case where the front derailleur is at the high speed stage caused by turning the lever 3 in the arrow X direction to the position shown by the dot-and-dash line in FIG. 6 thereby rotating the second winding body 5 clockwise, the rear derailleur is shifted to the low speed stage by moving the lever 3 in the arrow Z direction against the spring 35 to locate the retainer 23 within the neutral zone. Lever 3 is then turned in the arrow Y direction to reach position shown by the solid line. Thereafter, the lever 3 is further moved in the arrow Z direction toward the first winding body 4 to engage the retainer 22 with the first engaging portion 43 at the first winding body 4 and then is turned in the arrow X direction while keeping the engagement of retainer 2 with the first engaging portion 43.

Accordingly, the control lever 3 is, like in the former embodiment, shifted radially of the pivot 2 to engage one of the retainers 22 and 23 selectively with one of the first and second engaging portions 43 and 55 at the first and second winding bodies 4 and 5, thereby rotating one of the winding bodies 4 and 5 together with the lever 3 to separately control the front or rear derailleur.

In the above described embodiments, the control lever 3 was made movable radially of the pivot 2; however, the control lever 3 may be made movable axially of the pivot 2 as shown in FIG. 8. The lever 3 in FIG. 8 has at its pivoting portion a bore of a larger diameter than the outer diameter of the collar 6 so that the lever 3 may lean axially of the pivot 2. Between the lever 3 and the first and second winding bodies 4 and 5 are provided return springs 37 and 38. Lever 3 under the urging of springs 37 and 38 is always engaged at the retainer 23 with the second engaging portion 55 at the second winding body 5.

In addition, the lever 3 is also provided with the retainers 22 and 23 and the first and second winding bodies 4 and 5 have the first and second engaging portions 43 and 55 engageable with the retainers 22 and 23 respectively.

As clearly understood from the aforesaid description, the speed changing device of the invention is so constructed that a single control lever is pivoted to a single pivot, two wire winding bodies are arranged at both axial sides of the lever and pivoted to the pivot, and a coupling means is provided to couple the lever selectively with one of the winding bodies, so that the lever is controlled to separately operate the rear or front derailleur. Hence, the speed changing device becomes, as a whole, simple in construction and enables an accurate control of the rear or front derailleur. Furthermore, the control lever even though having a restricted turning range, is able to operate both front and rear derailleurs, and a display of a speed change stage is accurately carried out.

As many apparently widely different embodiments of this invention may be made without departing from the spirit and scope thereof, it is to be understood that the invention is not limited to the specific embodiments described except as defined in the appended claims.

What is claimed is:

1. A bicycle speed changing device for controlling a front and a rear derailleur comprising:
   a base member having a pivot arm;
   one control lever rotatably supported to said pivot arm;

a first and a second winding body independently rotatable on said pivot arm and positioned axially of said control lever, a first control wire carried by said first winding body and connecting said first winding body with said front derailleur, a second control wire carried by said second winding body and connecting said second winding body with said rear derailleur; and coupling means for selectively coupling said control lever with one of said first and second winding bodies such that turning rotation of said control lever is imparted to said one selected winding body, said coupling means comprising a first and a second engaging portion respectively provided at said first and second winding bodies and at least one retainer supported to said lever so as to be movable radially of each of said winding bodies and rotating integrally with said control lever and engageable selectively with one of said engaging portions for causing one of said winding bodies to rotate integrally with said control lever, said first winding body having a circular outer periphery in which said first engaging portion is included, and said second winding body having a swollen portion larger in diameter than said first winding body, said larger diameter portion providing an elongate slot in the shape of a circular arc extending along the rotation direction of said retainer, said slot having at the inner surface thereof said second engaging portion which is engageable with said retainer, said slot also having a radially outward inner surface having a larger diameter than an outer diameter of said first winding body to provide an interval between said radially outward inner surface of said slot and the outer periphery of said first winding body which is larger than the thickness of said retainer, said interval extending radially of said winding body and providing a neutral zone in which said retainer is not engaged with said first and second engaging portions.

2. The bicycle speed changing device according to claim 1, wherein said lever is radially movable with respect to said pivot, said lever having two retainers fixed thereto respectively protrudent toward said winding bodies, said lever being movable radially of said pivot to allow one of said retainers to be engaged selectively with one of said first and second engaging portions.

3. The bicycle speed changing device according to claim 2, wherein said lever has at a portion thereof pivoted to said pivot an elongate slot extending radially of said pivot, said slot housing therein a spring inserted between a side of said pivot and one lengthwise end of said slot for urging said lever lengthwise outwardly of said pivot.

4. A bicycle speed changing device for controlling a front and a rear derailleur comprising;

a base member having a pivot arm;

one control lever rotatably supported to said pivot arm, said lever comprising a lever body, a lengthwise movable control rod extending along the length of said lever, and a grip fixed to one end of said lever remote from said pivot arm, said grip including a means for controlling lengthwise movement of said control rod and means for continuously biasing said control rod toward said pivot arm, a first and a second winding body independently rotatable on said pivot arm and positioned axially of said control lever, a first control wire carried by said first winding body and connecting said first winding body with said front derailleur, a second control wire carried by said second winding body and connecting said second winding body with said rear derailleur; and coupling means for selectively coupling said control lever with one of said first and second winding bodies such that turning rotation of said control lever is imparted to said one selected winding body, said coupling means comprising a first and a second engaging portion respectively provided at said first and second winding bodies and at least one retainer supported to said control rod so as to be movable radially of each of said winding bodies and rotating integrally with said control lever and engageable selectively with one of said engaging portions for causing one of said winding bodies to rotate integrally with said control lever, said first winding body having a circular outer periphery in which said first engaging portion is included, and said second winding body having a swollen portion larger in diameter than said first winding body, said larger diameter portion providing an elongate slot in the shape of a circular arc extending along the rotation direction of said retainer, said slot having at the inner surface thereof said second engaging portion which is engageable with said retainer, said slot also having a radially outward inner surface having a larger diameter than an outer diameter of said first winding body to provide an interval between said radially outward inner surface of said slot and the outer periphery of said first winding body which is larger than the thickness of said retainer, said interval extending radially of said first winding body and providing a neutral zone in which said retainer is not engaged with said first and second engaging portions.

* * * * *